June 29, 1965 W. DICK ETAL 3,191,920
APPARATUS FOR REDUCING METAL OXIDES, ESPECIALLY IRON OXIDES
Filed Aug. 10, 1961 2 Sheets-Sheet 2
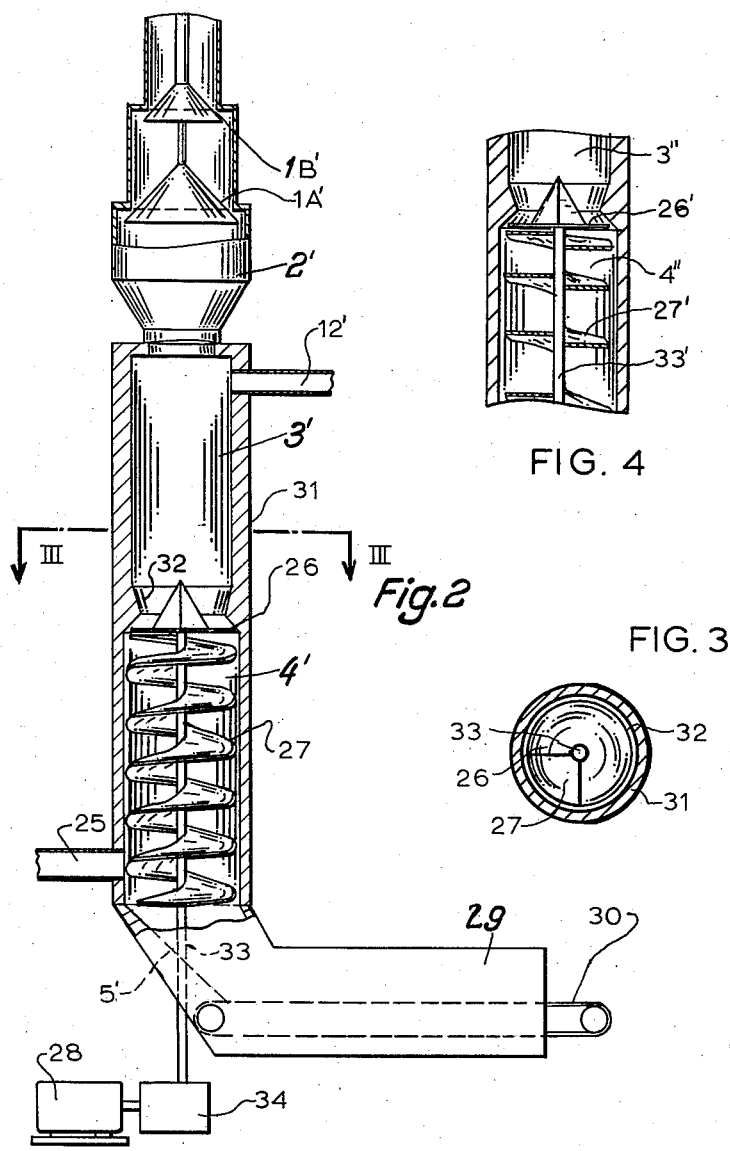
LUDWIG VON BOGDANDY
WALTHER DICK
*Inventors*
BY
AGENT

United States Patent Office 3,191,920
Patented June 29, 1965

3,191,920
APPARATUS FOR REDUCING METAL OXIDES, ESPECIALLY IRON OXIDES
Walther Dick, Oberhausen, Rhineland, and Ludwig von Bogdandy, Essen-Frintrop, Germany, assignors to Huttenwerk Oberhausen Aktiengesellschaft, Oberhausen, Rhineland, Germany, a corporation of Germany
Filed Aug. 10, 1961, Ser. No. 130,664
Claims priority, application Germany, Aug. 19, 1960, H 40,243
2 Claims. (Cl. 266—25)

Our present invention relates to an ore-reduction furnace.

It is an object of our present invention to provide an improved apparatus for reducing metal oxides utilizing only gaseous fuel.

It is a further object of our present invention to provide an apparatus for reducing metal oxides in a very economical manner and, specifically, with a high degree of thermal efficiency and at a rapid rate.

It has already been suggested to reduce metal ores, in particular iron oxides, to substantially pure metal by using only gases, such as methane, carbon monoxide, hydrogen or mixture of these, without additional solid fuels. The corresponding chemical reactions given by way of example for iron oxide are:

$$Fe_nO_y + yH_2 = nFe + yH_2O$$

or $$Fe_nO_y + yCO = nFe + yCO_2$$

where $n$ and $y$ are integers.

It is usual ore-reducing practice to use a shaft or cupola furnace in which the ore charge and the reducing gases move in opposite directions relatively to each other, generally in a vertical cylindrical chamber, the charge being loaded from the top of the furnace and the reduced metal collecting at the bottom. The gases are first heated to the reducing temperature and then fed into the bottom part of the furnace.

This arrangement has the disadvantage that the whole weight of the charge rests on the hot reduced metal, thereby pressing it together and disrupting its consistency. This can endanger the removal system and also lead to an irregular gasification of the charge.

According to the salient feature of the present invention, the reduction furnace is divided into a pre-reduction chamber and a final-reduction chamber arranged in such manner as to prevent the charge of the pre-reduction chamber from resting directly on the charge in the final-reduction chamber. The pre-reduction and final-reduction chambers are so connected as to permit the charge from the pre-reduction chamber to enter the final-reduction chamber and the reducing gases from the final-reduction chamber to pass into the pre-reduction chamber.

Whereas the pre-reduction chamber of our improved furnace will be substantially vertical, the final-reduction chamber adjoining the lower or discharge end of the pre-reduction chamber need not also be vertical but may be inclined at various angles to the horizontal. If this inclination is but slight, i.e. if the downward slope of the path for the solids leaving the pre-combustion chamber is small, it is desirable to design the final-reduction chamber as a rotary drum adapted by its rotation to promote the flow of the ores through that chamber. In other instances it will be sufficient to provide internal transport means, such as a rotating worm, within the stationary final-reduction chamber, while with nearly or completely vertical chambers it is even possible to dispense with all forced-feed mechanism. If the two chambers are more or less aligned, however, a discontinuity adapted to relieve the pressure in the lower chamber, such as a rotatable supporting platform, should be provided at the junction of the two chambers. Thus, the charge in the final-reduction chamber will in each case be substantially unencumbered by the weight of the charge in the adjoining pre-reduction chamber.

The advantages obtained by a reduction furnace according to the invention reside mainly in the possibility of utilizing a substantially higher reducing temperature for increasing the reduction rate. A further positive effect of the invention is the decreased tendency of the charge particles to stick together even at these high temperatures. The operating temperature in the final-reduction chamber can, therefore, be as high as 1,200° C. in the case of iron ores. This markedly accelerates the reduction rate since a temperature rise of 100° C. at temperatures around 1,000° C. has the effect of increasing the reduction rate by about 20%. Also, the otherwise unavoidable tendency of the reduction gases to form channels in their passage through the charge will be counteracted by the mechanical agitation preferably provided in our improved system. The rotary motion of the charge subjects always new ore particles to the main streams of gas so that a regular rate of reduction throughout the whole metal-oxide mass is attained.

In the practice of our invention for the reduction of iron ore we prefer to utilize a reducing gas containing not less than 60% of carbon monoxide and hydrogen which enters the final-reduction chamber at a temperature which is close to the melting point of the charge, i.e. of approximately 1,200° C. or higher, and thence flows into the pre-reduction chamber at a temperature of not more than 1,000° C. The gas velocity and the dimensions of the chambers are preferably so selected that the gas, at 0° C. and in the absence of a charge, would traverse the final-reduction chamber in about 1 to 10 seconds and the pre-reduction chamber in about twice that time. This makes it possible to utilize nearly fully the chemical activity of the gas.

The invention will be better understood from the following detailed description given with reference to the accompanying drawing in which:

FIG. 2 is a side-elevational view (parts broken away) of a different embodiment of the invention;

FIG. 3 is a sectional view taken on the line III—III of FIG. 2; and

FIG. 4 is a fragmentary view similar to part of FIG. 2 but showing a further modification.

Figure 1:
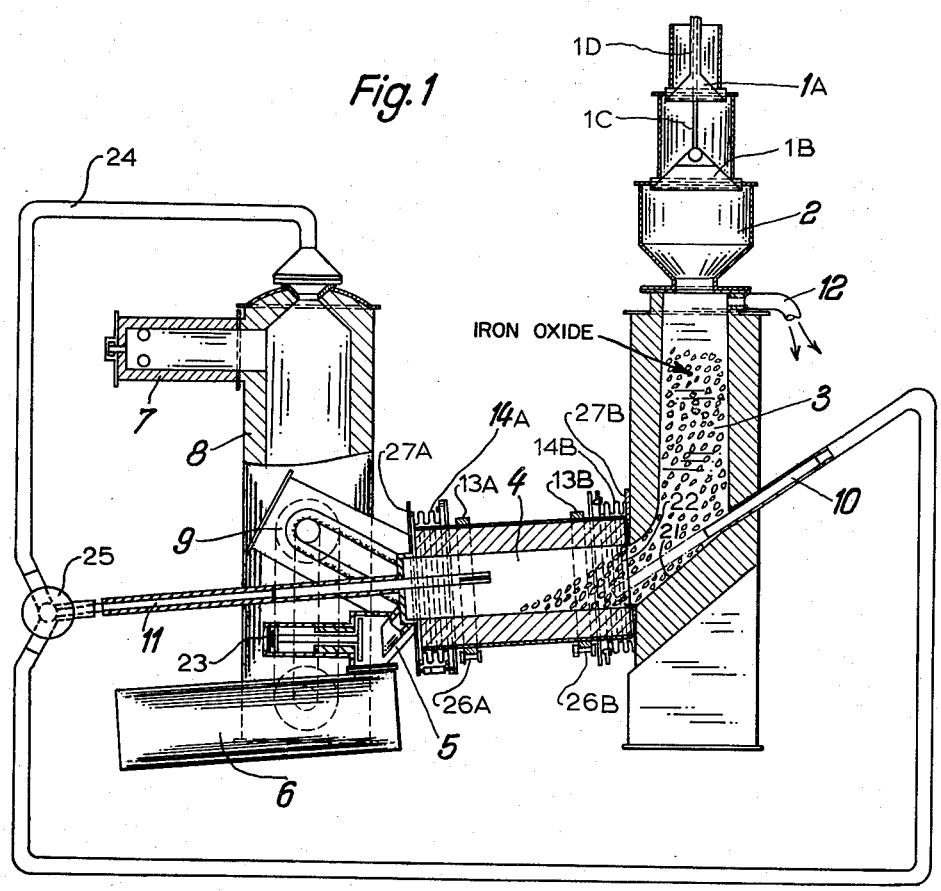
FIG. 1 is a cross-sectional side-view of a reduction furnace according to the present invention.

As shown in FIG. 1, an ore charge is introduced through two cascaded bell-shaped shutters 1A, 1B adapted to be opened (e.g. manually) with the aid of telescoped stems 1C, 1D. The charge then passes through a hopper 2 and enters a pre-reduction chamber 3 where it is pre-heated by the rising reduction gases and preliminary reduction takes place. A slanting bottom 21 of the chamber 3 supports most of the weight of the charge and diverts its flow toward a rotating drum 4 directly connected to a side opening 22 of chamber 3. The drum 4 serves as a final-reduction chamber from which the reduced mass slides over a chute 5 into a cooling vessel 6 whence the metal can be recovered; chute 5 can be selectively opened and closed by a hydraulically operated plunger 23. The necessary reduction gases are prepared and pre-heated in a cyclone-type combustion chamber 7, in which a first-stage gas reaction takes place, and a chamber 8 for a secondary gas reaction, both serving to produce a gas of the desired temperature and composition, especially as regards CO and $H_2$. An apparatus for producing reduction gases of a generally similar type has been more fully disclosed in commonly assigned U.S. Patent application Ser. No. 10,124, filed February 23, 1960. The reduction gas flows into the final-reduction chamber 4 via a conduit 24, a valve 25 and a tube 11; an auxiliary inlet tube 10 is adjustably positioned near the bottom of pre-combustion chamber 3 for admitting additional reduction gas, if needed, at the junction of the two chambers. The drum 4 has external rings 13A, 13B resting on several sets of rollers 26A, 26B (only one set being shown) and is provided at its ends with bellows-type seals 14A, 14B attached to stationary end flanges 27A, 27B. A transmission 9 is provided to rotate chamber 4. An exhaust pipe 12 at the top of chamber 3 serves for the discharge of the spent reduction gases.

The ore-reducing apparatus shown in FIG. 1 operates in the following manner:

A charge of iron oxide is fed into the pre-reduction chamber 3 via hopper 2. Reduction gas comprising not less than 60% of oxidizable components such as CO and $H_2$ and having a minimum temperature of approximately 1200° C. enters the final-reduction drum 4 from the secondary gas-reaction chamber 8 through distributing valve 25 and conduit 11. The rotating drum 4, so dimensioned as to provide a gas-transit time of the magnitude specified hereinabove, is rotated at a speed preferably so chosen as to keep its peripheral velocity within the limits of 0.1 to 10 meters per minute.

The incomplete chemical and thermal utilization of the gases in the final-reduction chamber 4 is followed by their further utilization in the partial reduction of the base charge in the chamber 3. Best results are obtained if the gases are allowed to enter the pre-reduction chamber 3 at slightly less than 1000° C. As long as this temperature limit is not surpassed, there is no danger of any lumping or caking of the highly compacted charge particles in the pre-reduction chamber 3. From the drum 4 the reduced mass passes upon the opening of chute 5 by the means of closure device 23 into the cooling vessel 6 which can be periodically unloaded by means not further illustrated.

The embodiment shown in FIGS. 2 and 3 comprises a vertical cylindrical shaft-like housing 31 of refractory material forming the reduction furnace. The upper part of housing 31 bears a hopper 2' supplied with ore via closure means 1A', 1B' of the type heretofore described. The bottom of housing 31 opens into a horizontal tubular cooling chamber 29 having a conveyor 30 for removing the finished product. A chute 5' leads the charge descending through the reduction furnace into the receptacle 29.

The housing 31 is divided by a rotatable platform in the shape of a sectoral disk 26, situated at approximately the center of its height, into a pre-reduction chamber 3' and a final-reduction chamber 4'. The junction of the two chambers 3', 4' is marked by a slight internal construction 32 overlying the disk 26 to help bear the weight of the charge in chamber 3'. A worm conveyor 27 joined at its top to the disk 26 passes through the final-reduction chamber 4' over its whole length. The shaft 33 of the conveyor 27 is driven by an electric motor 28 via a step-down transmission 34 which may be adjustable to vary the rate of feed. Reduction gases from a generator similar to the one shown at 7, 8 in FIG. 1 enter the housing 31 at the bottom of the final-reduction chamber 4' through a pipe 25. The spent reduction gases escape at the top of the pre-reduction chamber through a pipe 12'.

The reduction furnace shown in FIGS. 2 and 3 operates in a manner similar to that of the apparatus illustrated in FIG. 1, hence its functioning need not be described any further.

In FIG. 4 we show a modification of the reduction furnace of FIGS. 2 and 3 in which only the disk 26' at the junction of chambers 3'', 4'' is rotated by the shaft 33' whereas the worm 27 has been replaced by a stationary helical ramp 27' along which the charge slides downwardly during the final reduction step.

Our invention is, of course, not limited to the specific embodiments described and illustrated but may be realized in various modifications and adaptations without departing from the spirit and scope of the appended claims.

We claim:

1. An apparatus for reducing metal oxides, comprising a prereducing furnace forming a substantially vertical first chamber having an inlet for a charge of iron ore at its upper end and a generally lateral opening at its lower end; a rotary drum-type final-reducing furnace extending laterally of said prereducing furnace and communicating therewith at said outlet whereby a continuous column of charge can pass uninterruptedly from said first chamber into a second chamber defined by said drum-type furnace, said second chamber communicating with said first chamber only through said outlet for admission of a reducing gas from said second chamber to said first chamber, said first chamber terminating in a downwardly sloping surface leading to said second chamber for supporting part of the weight of said column in said first chamber while permitting sliding of the ore of said column along said surface from said first chamber into said second chamber; a source of reducing gas; conduit means connected to said source and extending substantially axially into said rotary furnace for introducing said reducing gas into said second chamber at a location remote from said outlet of said first chamber whereby said gas passes countercurrent through substantially the entire length of said column in both of said chambers; and means for rotating said drum-type furnace.

2. An apparatus as defined in claim 1 wherein said conduit means is provided with a branch entering said final-reducing furnace by way of said outlet and opening into said chamber for admitting additional reducing gas into same.

References Cited by the Examiner

UNITED STATES PATENTS

| 1,121,559 | 12/14 | Heslewood | 266—10 |
|---|---|---|---|
| 1,401,222 | 12/21 | Wiberg | 75—35 |
| 1,815,899 | 7/31 | Brassert | 75—38 |
| 1,849,658 | 3/32 | Brassert | 266—10 |
| 2,231,760 | 2/41 | Foerster et al. | 75—34 |
| 2,283,163 | 5/42 | Brassert et al. | 266—25 X |
| 2,296,522 | 9/42 | Hartley | 75—33 |
| 2,470,106 | 5/49 | Parry | 75—34 |
| 2,739,807 | 3/56 | Stuart | 266—25 |
| 2,767,076 | 10/56 | Taylor | 75—34 |
| 2,784,960 | 3/57 | Lee | 75—33 X |
| 2,857,155 | 10/58 | Dickey | 266—25 |

FOREIGN PATENTS

| 1,040,191 | 10/58 | Germany. |
|---|---|---|
| 253,391 | 6/26 | Great Britain. |
| 269,959 | 4/27 | Great Britain. |
| 744,655 | 2/56 | Great Britain. |

JOHN F. CAMPBELL, *Primary Examiner.*

RAY K. WINDHAM, MORRIS O. WOLK, *Examiners.*